United States Patent
Gross et al.

[11] Patent Number: 5,868,091
[45] Date of Patent: Feb. 9, 1999

[54] FLOAT MOUNTED AERATOR HAVING A WORK DECK

[75] Inventors: Peter S. Gross, Plymouth; Weselley E. Slaymaker, Minneapolis, both of Minn.

[73] Assignee: Aeromix Systems, Inc., Minneapolis, Minn.

[21] Appl. No.: 800,842

[22] Filed: Feb. 14, 1997

[51] Int. Cl.⁶ ................................. B63B 1/12; C02F 7/00
[52] U.S. Cl. .......................................... 114/61; 210/242.2
[58] Field of Search .......................... 210/242.2; 114/61, 114/283, 85, 368; 441/44, 45, 46; 312/307

[56] References Cited

U.S. PATENT DOCUMENTS

| | | | |
|---|---|---|---|
| 1,914,573 | 6/1933 | Kookogey | 114/85 |
| 3,010,231 | 11/1961 | Matelich | 114/61 |
| 3,561,738 | 2/1971 | Galeano | 210/242.2 |
| 3,759,495 | 9/1973 | Boler et al. | 210/242.2 |
| 4,148,465 | 4/1979 | Bowman | 114/368 |
| 4,268,398 | 5/1981 | Shuck et al. | 210/242.2 |
| 4,741,825 | 5/1988 | Schiller | 210/242.2 |
| 4,806,251 | 2/1989 | Durda | 210/242.2 |
| 4,997,557 | 3/1991 | Andersen | 210/242.2 |
| 5,330,639 | 7/1994 | Murphree | 210/242.2 |
| 5,744,072 | 4/1998 | Karliner | 114/352 |

*Primary Examiner*—Sherman Basinger
*Attorney, Agent, or Firm*—Kinney & Lange

[57] ABSTRACT

A floatable aeration apparatus having a flotation system, a work deck and an aerator. The aerator and the work deck are supported by the flotation system. The work deck is configured to support an operator for improved safety during maintenance procedures. In the preferred embodiment, the floatable aeration apparatus further includes a receptacle for supporting a portable crane.

9 Claims, 1 Drawing Sheet

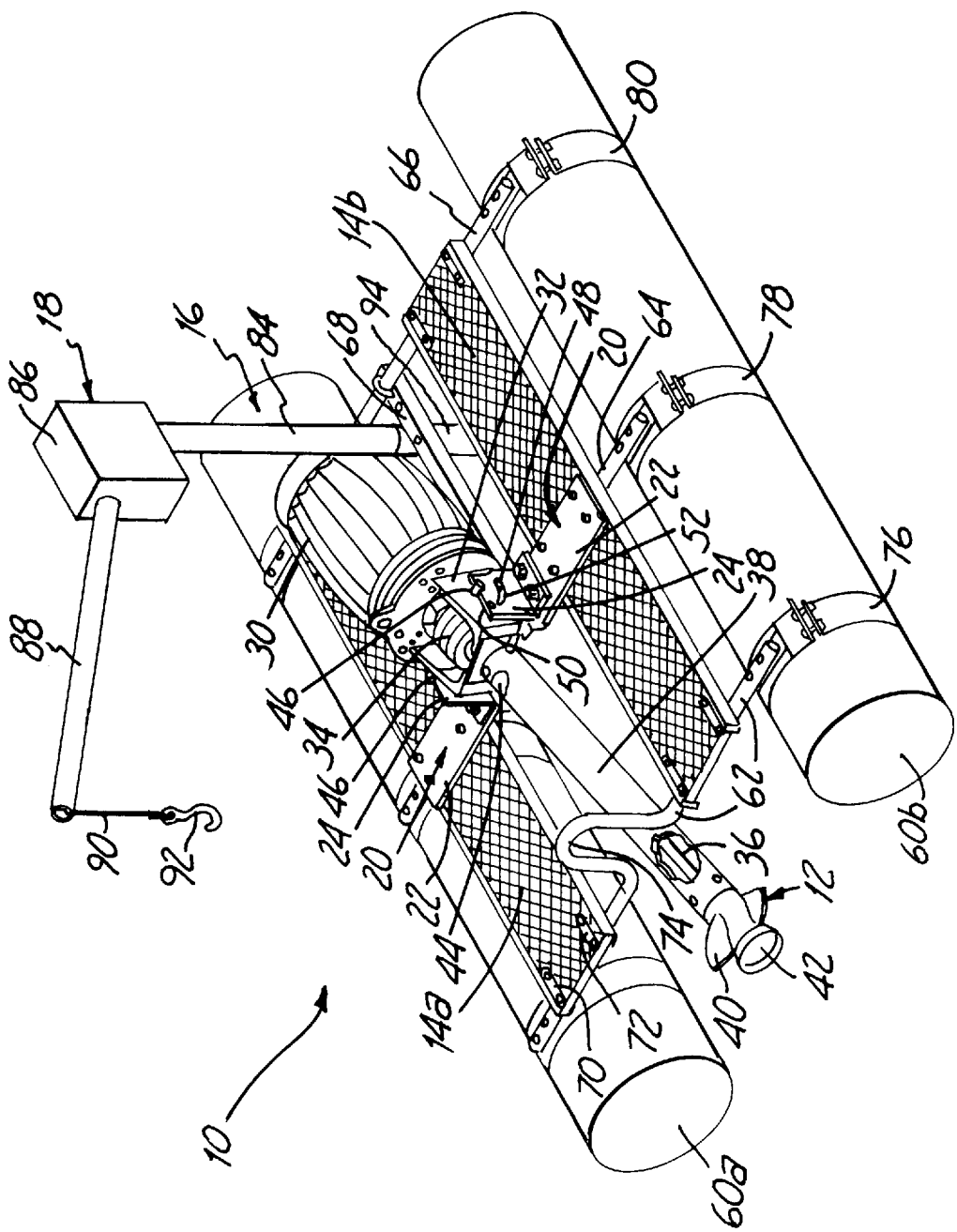

FLOAT MOUNTED AERATOR HAVING A WORK DECK

BACKGROUND OF THE INVENTION

The present invention relates to an improved floatable aeration apparatus. More particularly, it relates to a float mounted aerator having a work deck for providing increased maintenance worker safety.

Aeration is a widely used technique for treating, oxidizing and/or mixing a variety of fluids. For example, municipal water treatment plants, paper mills and drainage ponds all utilize aeration to continuously oxygenate and treat waste water. These facilities normally maintain extremely large volumes of waste water, which often contains sludge or other odor producing materials. Aeration has proven to be highly successful at these and other applications in eliminating odors, maintaining fluid content disbursement and providing aerobic sludge.

Aeration or fluid mixing can be accomplished with different devices. These include forced air pumps and independent mixers. With waste water applications, however, the fluid to be aerated is maintained within one or more basins having large volume capacities, ranging from thousands to millions of gallons. Due to this large size, an aerator which can easily be moved to various locations within the basin is optimal. Float mounted aerators are designed to meet the aerating needs presented by large scale waste water holding basins.

A float mounted aerator basically includes a flotation system, including a pair of floats or pontoons, which supports an aerator. The aerator itself includes a motor coupled to a shaft which rotates a propeller which has an open hub. During use, the flotation system maintains the motor and a top end of the shaft above the waste water surface while a lower end, including the propeller, is below the waste water surface. An off site power supply powers the motor that in turn rotates the shaft and the propeller. As the propeller rotates, air is drawn into an air intake in the shaft and forced into the waste water from the open propeller hub. Alternatively, recent improvements to float mounted aerators include a directional tube surrounding a solid shaft. Rotation of the propeller draws air into an air intake in the directional tube and injects it through the open hub of the propeller, which is in communication with the directional tube, and into the waste water. With either approach, rotation of the propeller imparts a mixing action into the waste water. Because the aerator is float mounted, it can easily be maneuvered to different locations within the basin.

Float mounted aerators have proven to be quite successful in maintaining and/or restoring the sludge dispersion and overall quality of waste water. However, maintenance of the float mounted aerator, which most often takes place while the device is floating in the waste water, presents significant safety concerns. Normally, the aerator is mounted between two cylindrical pontoons in a pivoting fashion. With this design, the propeller and the lower end of the shaft are serviced by pivoting the aerator such that the propeller is lifted out of the waste water. To accomplish this, a maintenance worker is forced to either lean out of a boat to service the aerator, or attempt to balance on one of the rounded, slippery pontoons. Either approach is dangerous. For example, the maintenance worker may lean too far from the boat and consequently fall. Alternatively, because the pontoons are normally quite slippery, a maintenance worker faces the distinct possibility of slipping off.

Float mounted aerators are highly useful devices. However, maintenance of the float mounted aerator presents prominent safety concerns. Therefore, a need exists for a floatable aeration apparatus having a work deck for improved maintenance worker safety.

SUMMARY OF THE INVENTION

The present invention provides a floatable aeration apparatus comprised of an aerator, a work deck and a flotation system. The aerator is supported by the flotation system. The work deck is also supported by the flotation system, in close proximity to the aerator. In the preferred embodiment, the work deck is a grate which provides a non-skid surface.

To service the aerator, a maintenance worker simply stands on the work deck. In a preferred embodiment, the floatable aeration apparatus of the present invention further includes a crane to facilitate lifting the aerator from the flotation system.

BRIEF DESCRIPTION OF THE DRAWINGS

The figure is a perspective view of a floatable aeration apparatus having a work deck and portable crane in accordance with the preferred embodiment of the present invention.

DETAILED DESCRIPTION OF THE PREFERRED EMBODIMENTS

A preferred embodiment of a floatable aeration apparatus 10 is shown in the figure. The floatable aeration apparatus 10 includes an aerator 12, work decks 14a and 14b, a flotation system 16 and a portable crane 18. The aerator 12, the work decks 14a and 14b, and the portable crane 18 are connected to and supported by the flotation system 16. The aerator 12 is disposed between the work decks 14a and 14b. In this regard, the work decks 14a and 14b are symmetrical and include identical bracket assemblies 20 for maintaining the aerator 12. Each of the bracket assemblies 20 includes a plate 22 attached to a shoulder 24.

The aerator 12 includes a motor 30, a housing 32, coupling flanges 34, a shaft 36, a directional tube 38, a propeller 40 and an open hub 42. The housing 32 maintains the coupling flanges 34 which are attached at one end to the motor 30. The coupling flanges 34 are also attached to the shaft 36, which extends through the directional tube 38. The directional tube 38 includes an air intake 44 for receiving air. The propeller 40 is rotatably disposed on an end of the directional tubing 38, and is driven by the shaft 36. Finally, the propeller 40 terminates in the open hub 42.

The motor 30 is preferably an electric motor powered by an off site source (not shown) directing a current supply through wiring (not shown) to the motor 30. Other forms of powering the aerator 12 are acceptable, such as a battery. The size of the motor 30 will vary according to the needs of a particular waste water treatment application. For example, the motor 30 can range in size from one horse power to one hundred horse power.

The housing 32, as previously described, partially encloses the coupling flanges 34. Additionally, the housing 32 provides a means for attachment to the bracket assemblies 20 and the flotation system 16. In particular, the housing 32 includes symmetrical mounting pins 46 and symmetrical guide pins 48 on opposite sides for engaging the bracket assemblies 20 as described in greater detail below. Notably, the figure only shows one of the symmetrical guide pins 48. The housing 32, including the symmetrical mounting pins 46 and guide pins 48, is preferably cast stainless steel.

The coupling flanges 34 provide a connection between the motor 30 and the shaft 36. In the preferred embodiment, the coupling flanges 34 are made from stainless steel.

A portion of the directional tube 38 is broken away to show the shaft 36. The shaft 36 is driven by the motor 30 and rotates the propeller 40. The shaft 36 is preferably solid, made from stainless steel.

The directional tube 38 surrounds the shaft 36 and is attached to the housing 32. The directional tube 38 defines an air passage between the air intake 44 and discharge from the open hub 42 of the propeller 40. Rotation of the propeller 40 within a liquid draws air into the air intake 44, through the directional tube 36, and into the liquid through the open hub 42.

The propeller 40 may be of any type known in the art, as is its connection to the shaft 36 and communication with the air passage formed by the directional tube 36. In the preferred embodiment, the propeller 40 is made of stainless steel.

In most applications, the aerator 12 will be supported by the bracket assemblies 20 at an angle between the horizontal and vertical (typically at approximately 30° from horizontal). With this configuration, the motor 30 is supported above the liquid surface while the propeller 40 extends below the liquid surface level.

Each bracket assembly 20 is identical and includes the shoulder 24, extending from the plate 22. The shoulder 24 includes a bearing surface 50 and a slot 52. In the preferred embodiment, the plate 22 is attached to one of the work decks 14a or 14b, such as by bolting, welding, etc. The shoulder 24, in turn, is similarly attached to an end of the plate 22, such as by bolting, welding, etc. In the preferred embodiment, the plate 22 and the shoulder 24 are made from stainless steel.

The aerator 12 is attached to the bracket assemblies 20 by mounting the symmetrical mounting pins 46 and the symmetrical guide pins 48 of the housing 32 to the bearing surface 50 and the slot 52 of the shoulder 24, respectively. In particular, one of the symmetrical mounting pins 46 rests on the bearing surface 50 while one of the symmetrical guide pins 48 rides in the slot 52. The aerator 12 pivots with respect to the bracket assemblies 20 by pivoting on the mounting pin 46. The guide pin 48 is guided within the slot 52 to define a range of motion. Thus, the slot 52 acts as a stop, preventing motion via interaction with the guide pin 48. Other forms of attachment are equally acceptable, such as by providing a singular opening in each of the shoulders 24 for receiving the mounting pin 46. Preferably, however, the mounting method allows the aerator 12 to pivot with respect to the bracket assemblies 20 such that the propeller 40 can be pivoted into and out of the liquid.

The work decks 14a and 14b are symmetrically arranged on opposite sides of the aerator 12. The work deck 14a or 14b preferably is a platform that assumes a grate configuration. This configuration provides a traction surface and prevents water from accumulating on top of the work deck 14a or 14b. Alternatively, the work deck 14a or 14b can be a solid platform having a corrugated or roughened surface. Even further, the work deck 14a or 14b can include a rubber coated top surface. In the preferred embodiment, the work decks 14a and 14b are made from stainless steel. However, other materials are equally acceptable, such as reinforced fiberglass, plastic, etc., so long as the work decks 14a and 14b have sufficient strength to maintain a maintenance worker and the aerator 12.

The work decks 14a and 14b are attached to the flotation system 16. The flotation system 16 includes pontoons 60a and 60b, a front support rod 62, an intermediate support rod 64, a rear support rod 66 and a columnar support 68. The support rods 62, 64 and 66 are attached at either end to one of the pontoons 60a and 60b. The columnar support 68 is centrally coupled to the intermediate support rod 64 and the rear support rod 66 to provide additional support and stability to the flotation system 16. Notably, the columnar support 68 is positioned beneath the intermediate support rod 64 and the rear support rod 66 such that the motor 30 can pivot to a position in which the directional tube 38 is approximately horizontal.

As shown in the figure, the work decks 14a and 14b are attached to each of the support rods 62–64 at two locations by circle clamps 70 and 72. The intermediate support rod 64 and the rear support rod 66 are preferably straight. The front support rod 62, however, is uniquely designed to allow for pivoting movement of the aerator 12. In particular, the front support rod 62 includes a bend 74. The bend 74 has a radius of curvature large enough for passage of the directional tube 38 of the aerator 12. Further, the bend 74 is preferably high enough so that the directional tube 38 can be raised to a point above the fluid surface. Preferably, the aerator 12 can be maneuvered such that the directional tube 38 is at least parallel with the work deck 14a and 14b. The support rods 62–66 and the columnar support 68 are preferably rigid, made from stainless steel.

The pontoons 60a and 60b are standard flotation devices, and therefore preferably comprise a sealed tube. Preferably, the pontoons 60a and 60b are made from stainless steel. Further, the pontoons 60a and 60b are configured to have a buoyancy sufficient to support the aerator 12, the work decks 14a and 14b, the portable crane 18 and a maintenance worker (not shown).

The pontoons 60a and 60b each include clamps 76, 78 and 80 for securing the support rods 62–64. In particular, each of the clamps 76, 78 and 80 comprises a stainless steel strap connector to which the support rod 62, 64 or 66, respectively, is attached. The clamps 76–80 are simply tightened about an outer circumference of the pontoon 60a or 60b. In the preferred embodiment, the clamps 76–80 can easily be loosened and repositioned along the pontoons 60a and 60b, respectively. This configuration provides for quick adjustment of the center of gravity of the aerator 12 with respect to the pontoons 60a and 60b. Therefore, the clamps 76–80 allow an operator to prevent vortexing or other operational problems by simply repositioning the aerator 12 with respect to the pontoons 60a and 60b.

The pontoons 60a and 60b act in concert with the support rods 62–66 and the columnar support 68 to support the aerator 12, and the work decks 14a and 14b. As shown in the figure, the support rods 62–66 are orientated with respect to the pontoons 60a and 60b such that the work decks 14a and 14b are maintained near or above a top level of the pontoons 60a and 60b and thus above the fluid surface level when the floatable aeration apparatus 10 is in use.

In the preferred embodiment, the floatable aeration apparatus 10 further includes the portable crane 18. The portable crane 18 includes an upright shaft 84, a gear box 86, a boom 88, a cable 90 and a hook 92. The cable 90 is wound within the gear box 86 and is positioned by the boom 88. Further, the cable 90 terminates with the hook 92. The gear box 86 can be electrical (such as an electrical winch) or mechanical to maneuver the cable 90 and thus the hook 82 in a vertical fashion. The upright shaft 84 is selectively secured to the flotation system 16 by placement in a receptacle 94 which is otherwise attached to the columnar support 68. It should be understood that the receptacle 94 is positioned along the columnar support 68 such that the receptacle 94 and the selectively attached portable crane 18 do not interfere with pivoting movement of the aerator 12 and in particular the motor 30.

During use, the floatable aeration apparatus 10 of the present invention operates similar to other float mounted aerators. The flotation system 16 buoyantly maintains the floatable aeration apparatus 10 along the fluid surface. Because the work decks 14a and 14b extend from a top side of the pontoons 60a and 60b, the work decks 14a and 14b are maintained above the fluid surface. The aerator 12 is positioned such that the propeller 40 is below the fluid surface. The motor 30 is activated via the off site power source (not shown), causing the shaft 36 to rotate. This rotating action draws air into the directional tube 38 via the air intake 44. Air is directed through the directional tube 38 to the open hub 42 where it is forced into the fluid being aerated. Further, the shaft 36 rotates the propeller 40, creating in a mixing action.

Periodically, the aerator 12 will require maintenance. To perform this maintenance, a maintenance worker (not shown) maneuvers himself to the floatable aeration apparatus 10, such as by boat, and simply stands on one of the work decks 14a or 14b. The top surface of the work deck 14a or 14b is preferably roughened so that chances of the maintenance worker slipping are minimized. The maintenance worker can access the propeller 40 or a lower portion of the directional tube 38 by pivoting the aerator 12 such that the propeller 40 is raised from the fluid. In this regard, the front support rod 62 includes the bend 74 which is sized to allow the directional tube 38 to pass.

As an alternative to manually raising the directional tube 38, or in instances where the entire aerator 12 must be replaced, the portable crane 18 is used. In this case, the maintenance worker brings the portable crane 18 with him or her to the floatable aeration apparatus 10 by way of a boat or other flotation device. The maintenance worker then stands on the work deck 14a or 14b and places the upright shaft 84 of the portable crane 18 into the receptacle 94 as shown in the FIG. 1. The hook 92 is then lowered via the cable 90 and attached to the aerator 12. Subsequently, the crane can be used to raise the aerator 12 to a desired level. Further, where the flotation system 16 is configured to provide sufficient support, the upright shaft 84 can be rotated with respect to the receptacle 94 to maneuver the aerator 12 to a position along side of the pontoons 60a and 60b, where it can be placed into a boat.

The floatable aeration apparatus 10 of the present invention addresses significant safety concerns presented by standard float mounted aerators. The work decks 14a and 14b are simple, yet highly effective, means for providing a maintenance worker with safe access to the aerator 12. The flotation system 16 associated with the work decks 14a and 14b is specifically designed to facilitate ease of maintenance of the aerator 12. Finally, the portable crane 18 is an additional safety feature not previously available.

Although the present invention has been described with reference to preferred embodiments, workers skilled in the art will recognize that changes may be made in form and detail without departing from the spirit and scope of the invention. For example, the pair of work decks can be replaced by a single work deck. In other words, while the work deck is preferably divided into symmetrical sections on opposite sides of the aerator, a single work deck platform in close proximity to the aerator will provide a sufficient support structure for the maintenance worker. Similarly, while the work decks are shown as being supported by front, intermediate and rear support rods, other flotation system frames are equally acceptable. For example, a fewer or greater number of support rods can be provided. Further, each support rod need not extend fully between both pontoons. Instead, where enough support is provided, the rod can terminate at the inner edge of the work deck. Regardless of the number of support rods or their design, enough support must be provided to maintain the aerator, work deck(s) and a maintenance worker.

The flotation system has been described as including two pontoons. These pontoons can be replaced by any of a number of available floats. For example, a single pontoon can be used to support the aerator and work deck. Alternatively, a buoy, floating platform, raft, etc. could be used.

The aerator has been shown as preferably including a solid shaft surrounded by a directional tube. Other types of aerators used in the industry are equally acceptable, such as a hollow shaft approach, for directing air.

Finally, the floatable aeration apparatus has been described as preferably including the portable crane. This portable crane can assist a maintenance worker in maneuvering an otherwise heavy aerator. However, the portable crane is an optional element to the present invention.

What is claimed is:

1. A floatable aeration apparatus comprising:
   a flotation system having a first float spaced from a second float;
   an aerator supported by the flotation system, wherein the aerator is disposed between the first and second floats; and
   a safety deck connected to the flotation system, wherein the safety deck is sized to support an operator, the safety deck having a longitudinally disposed central opening configured to allow rotation of the aerator with respect to the flotation system, the safety deck further comprising:
      a first platform positioned between the aerator and the first float;
      a second platform positioned between the aerator and the second float; and
      a rod connecting the first platform to the second platform such that the first platform and the second platform are supported by the first and second floats.

2. The floatable aeration apparatus of claim 1 wherein the aerator pivots with respect to the platforms and further wherein the rod is configured to allow positioning of a portion of the aerator parallel to the first and second platforms.

3. A floatable aeration apparatus comprising:
   a pair of symmetrical floats;
   a support frame attached to the symmetrical floats;
   clamps for selectively securing the support frame to the pair of symmetrical floats, the clamps configured to allow adjustment of a center of gravity of the floatable aeration apparatus;
   an aerator having a motor, a shaft, a directional tube, and a propeller, the aerator supported by the support frame; and
   a safety deck supported by the support frame, wherein the safety deck is sized to support an operator and is positioned in close proximity to the aerator.

4. The floatable aeration apparatus of claim 3 wherein the support frame is configured to maintain the safety deck and a portion of the aerator above a top surface of fluid to be aerated.

5. A floatable aeration apparatus of claim 3 wherein the safety deck comprises a first platform and a second platform disposed on opposite sides of the aerator.

6. The floatable aeration apparatus of claim 3 further comprising:
   a crane receptacle attached to the support frame, wherein the crane receptacle is configured to selectively receive a portable crane.

7. The floatable aeration apparatus of claim 3 wherein the safety deck includes a non-skid top surface.

8. A floatable aeration apparatus comprising:
   a pair of floats;
   a plurality of clamps;
   a support frame releasably attached to the floats by the clamps, the clamps configured to allow a longitudinal adjustment of the support frame with respect to the floats;
   an aerator supported by the support frame;
   a safety deck supported by the support frame, wherein the safety deck is sized to support an operator and is in close proximity to the aerator, and further wherein the safety deck has a first platform and a second platform disposed on opposite sides of the aerator.

9. The floatable aeration apparatus of claim 8 wherein the aerator further comprises:
   a motor;
   a drive shaft, the drive shaft having an upper end connected to the motor;
   a directional tube surrounding the drive shaft; and
   a propeller connected to a lower end of the drive shaft.

* * * * *